United States Patent [19]

Hackbarth

[11] Patent Number: 5,079,737
[45] Date of Patent: Jan. 7, 1992

[54] MEMORY MANAGEMENT UNIT FOR THE MIL-STD 1750 BUS

[75] Inventor: Holden G. Hackbarth, Colorado Springs, Colo.

[73] Assignee: United Technologies Corporation, Hartford, Conn.

[21] Appl. No.: 262,398

[22] Filed: Oct. 25, 1988

[51] Int. Cl.⁵ .............................................. G06F 12/06
[52] U.S. Cl. .................................. 395/425; 364/970.5; 364/969; 364/957; 364/957.1; 364/948.1; 364/970; 364/DIG. 2
[58] Field of Search .................................................. 364/200 MS File;900 MS File

[56] References Cited

U.S. PATENT DOCUMENTS

| | | | |
|---|---|---|---|
| 3,742,458 | 6/1973 | Inoue et al. | 364/200 |
| 4,368,515 | 1/1983 | Nielsen | 364/200 |
| 4,432,067 | 2/1984 | Nielsen | 364/900 |
| 4,473,877 | 9/1989 | Tulk | 364/200 |
| 4,485,457 | 11/1984 | Balaska et al. | 364/900 |

Primary Examiner—Gareth D. Shaw
Assistant Examiner—Kevin Kriess

[57] ABSTRACT

A single-chip memory management unit automatically operates in either 1750A or 1750B mode as required, including the provision of memory management and/or block protection, with the added feature of on-chip arbitration between two bus masters that may be either independent of the CPU or controlled by the CPU.

4 Claims, 6 Drawing Sheets

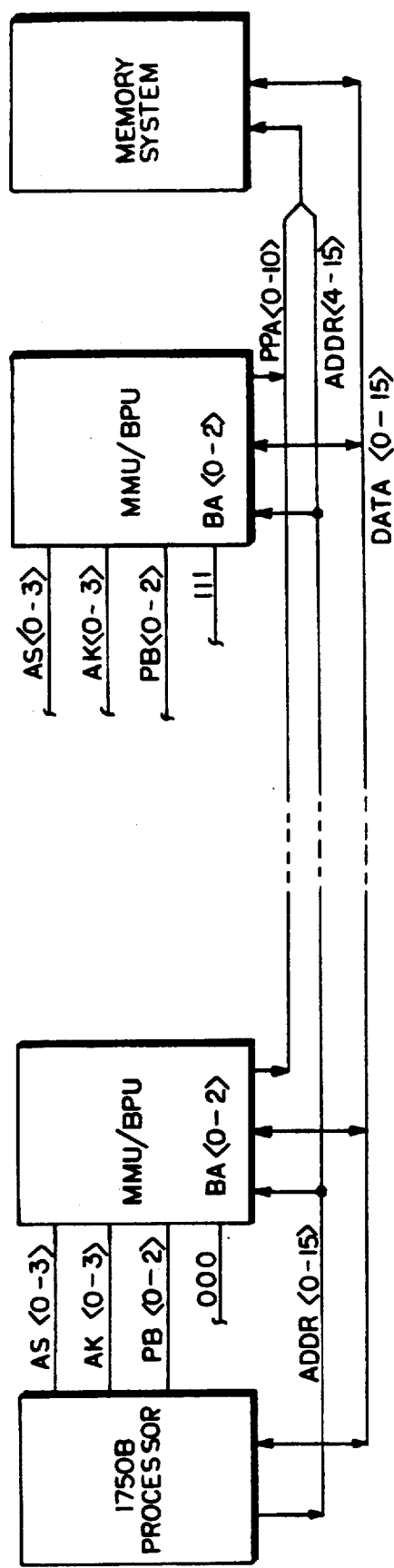
FIG. IB

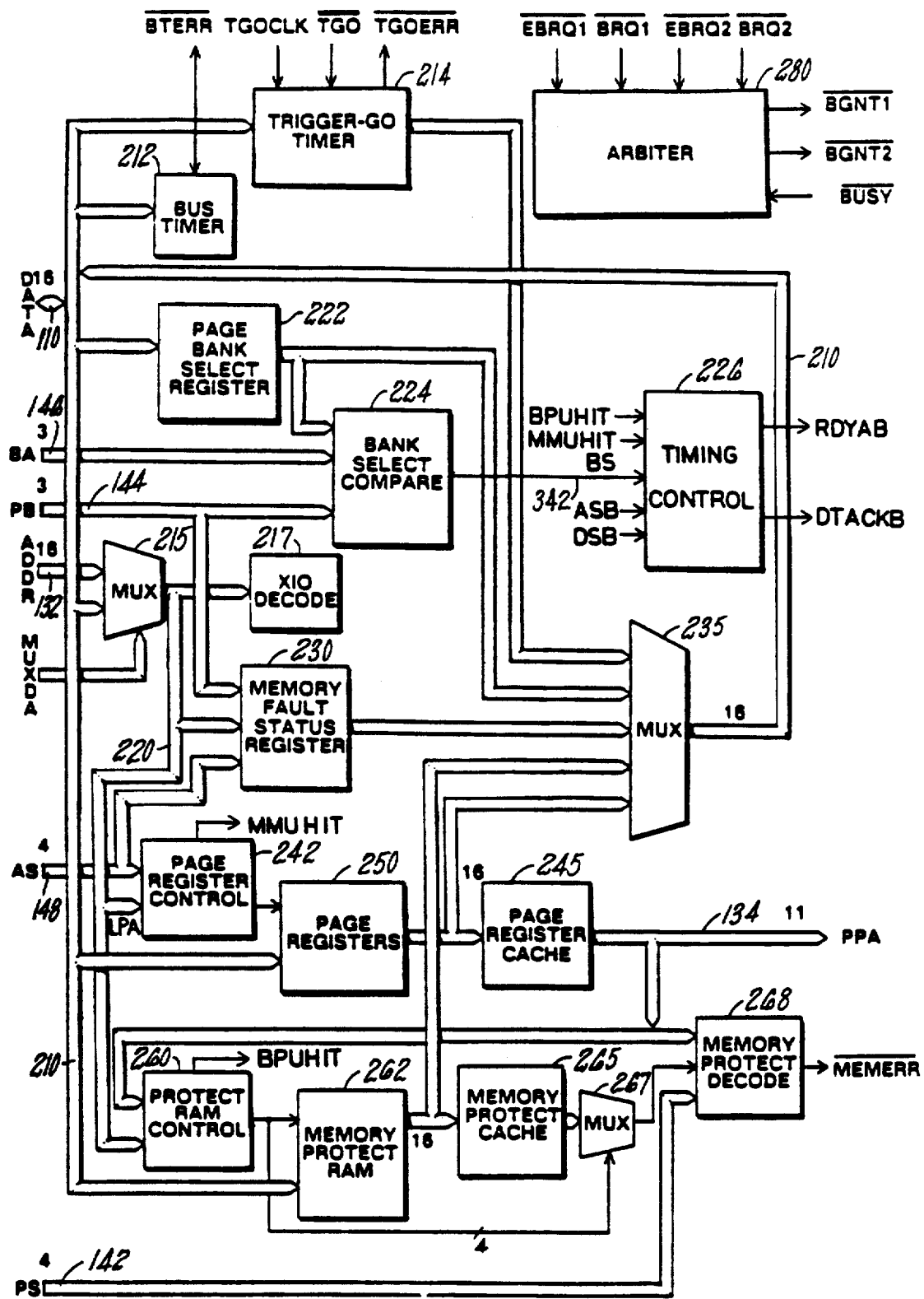

MEMORY MANAGEMENT UNIT FOR THE MIL-STD 1750 BUS

TECHNICAL FIELD

The field of the invention is that of digital processing within the framework of the MIL standard 1750 bus specification.

BACKGROUND ART

The well-known MIL-STD 1750 instruction set architecture for airborne computers includes provision for a memory management unit that has an expanded address as well as other features. The first implementation of the standard is the 1750A standard which provides for a total memory of 1M words, based on a logical address space of 64K words. An expansion of this standard, the 1750B instruction set architecture, includes provision for up to 8M words.

DISCLOSURE OF THE INVENTION

The invention relates to a single chip implementation for a memory management unit for the 1750 environment that is capable of addressing both the one megabyte memory address space of the 1750A specification and also the 8 megabyte memory address of the 1750B application.

A feature of the invention is the automatic recognition of 1750A or 1750B mode and chip selection, based on decoding of a portion of the memory address and a portion of the CPU processor status word.

Another feature of the invention is reduced access time resulting from the provision of variable numbers of wait states, depending upon the status of the integrated circuit and the function being performed.

Another feature of the invention is that the chip itself will arbitrate between two competing bus masters.

Other features and advantages will be apparent from the specification and claims and from the accompanying drawings which illustrate an embodiment of the invention.

BRIEF DESCRIPTION OF DRAWINGS

FIGS. 1A and 1B illustrate overall systems incorporating an integrated circuit according to the invention.

FIG. 2 illustrates a functional block diagram of the chip.

BEST MODE OF CARRYING OUT THE INVENTION

Figure 1A:
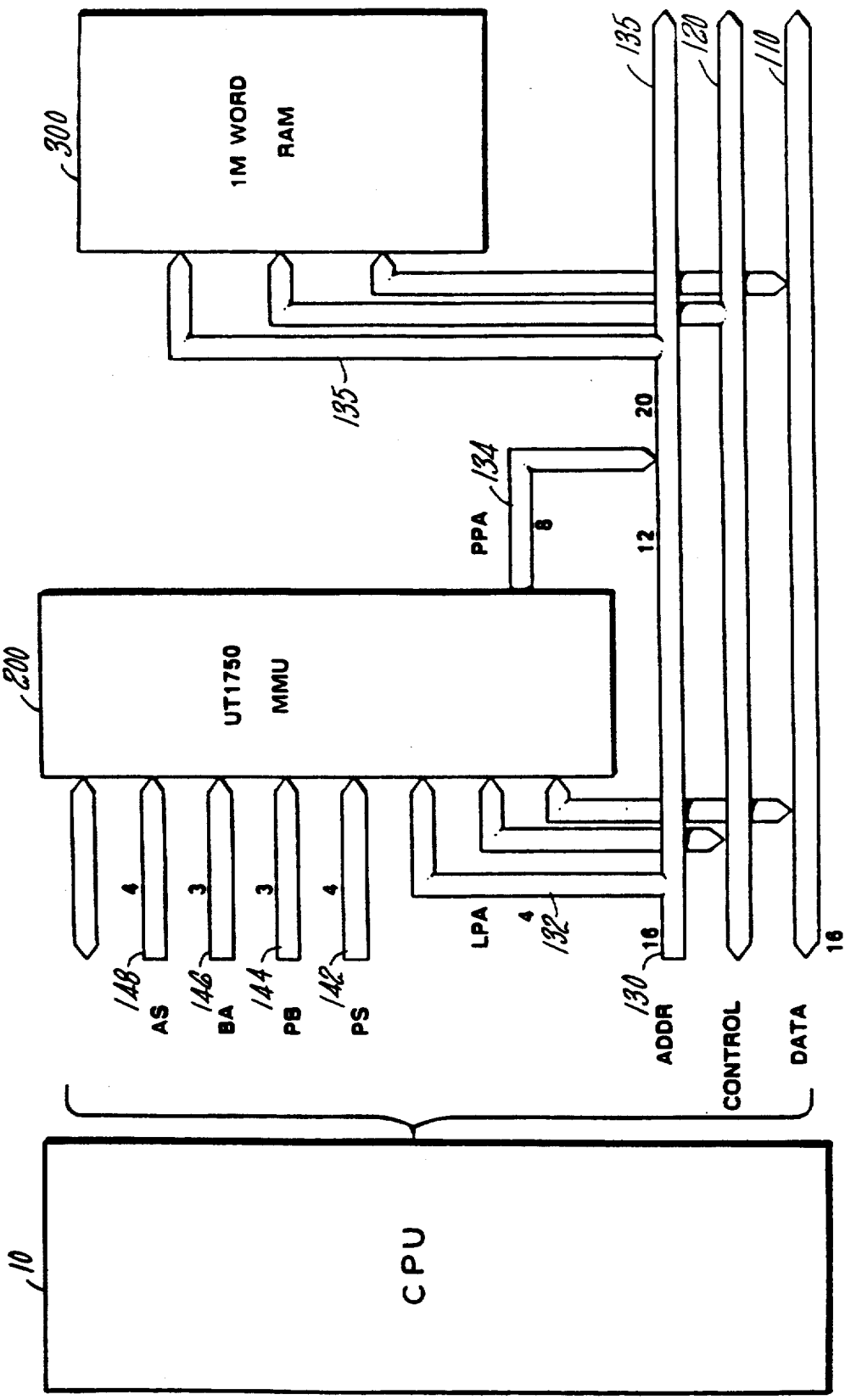

Referring now to FIG. 1A there is shown a system comprising a CPU 10, a memory management unit and a memory block 300. These three are connected by a set of three buses—an address bus 130, a control bus 120 and a data bus 110. In order to employ the expanded features of the system, the 64K available for memory in the standard 1750-spec CPU is expanded within the memory management unit 00. Address bus 130 emerging from the CPU is a 16 bit bus that enters unit 200. The 12 least significant bits of the bus are joined by a supplementary 8 bits that emerge from unit 200 on line 134 to form a 20 bit physical address capable of reaching the one megabyte word space in memory unit 300.

In FIG. 1B, there is shown a system for reaching the 8M address space of the 1750B specification. CPU 10 has additional control lines connected to its status word, including the 3-bit PS field that is compared with the hard-wired BA field for chip selection.

Figure 3:
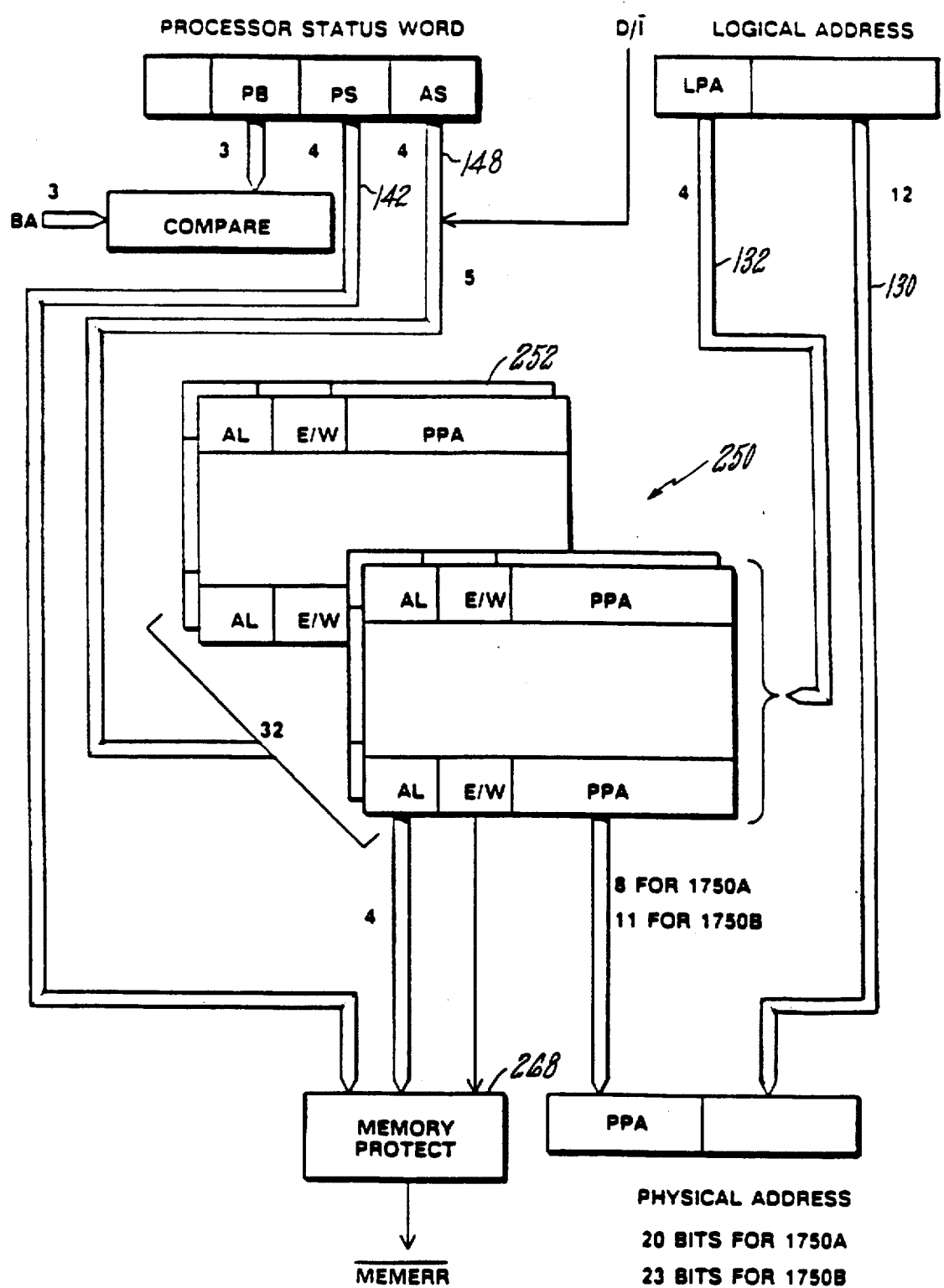
FIG. 3 illustrates the memory mapping structure of the invention.

Referring now to FIG. 3, there is shown a portion of the mapping structure that is used to construct the output physical page address on line 134 from the input data from the CPU 10. In the center of the Figure, there is a set of page registers referred to generally by the numeral 250 that comprises a set of 32 groups of data, each containing 16 registers. Each group, referred to as a page, is indicated by the numeral 252. Each register, referred to as a page register, contains a physical page address labeled PPA which is the output which is sent to the memory itself, together with two other fields. The field labeled AL is used for memory locking and will be described below. The field labeled E/W is a write protect bit used as a flag to protect against writing into that area. The physical page address is the starting address of a 64K page in memory 300. The translation from the incoming data to the physical page address is a lookup table function that is implemented by chip 200.

One register out of the 512 registers available is selected in the following fashion. A register within CPU 10, referred to as the processor status word, contains three fields that are relevant to the invention. One, PB is used for the 1750B specification and will be referred to below. The second field, labeled PS, is a four bit field that is used in the lock and key feature of the memory protection scheme described below. The last field, a four bit field labeled AS is passed on line 148 and joined by a fifth line which is the data instruction line coming from CPU 10. These five bits are sufficient to pick one register group out of the 32 available. The register groups or pages are divided into data pages and instruction pages, 16 of each. The remaining four bits in the physical page address are provided by the four most significant bits coming from CPU 10 along address bus 130. These bits form what is called the logical page address and serve to select one of the 16 registers within a page. As mentioned above, the 12 least significant bits pass along bus 130 to bus 135 and are joined by the eight bit physical address from memory management unit 200 to form the total 20 bit word for the 1750A specification. In the case of the 1750B specification, use is made of the fact that the PPA field in the registers can be up to 11 bits long, giving the full 23 bit address when combined with the 12 low bits in the address on bus 130. In 1750A applications, the additional unneeded three bits are not connected to the bus.

Referring now to FIG. 2, there is shown a functional block diagram of memory management unit 200. On the left a bus 210 passes vertically along the edge of the Figure having as input data bus 110 coming from the CPU. An optional input may be employed by multiplexing bus 210 with both data and addresses. Multiplexer 215 accepts as input either the 16 bit address bus 132 or the data bus 210-110. Ordinarily, the data bus is used and is input on bus 210 to the first level of functional blocks.

At the top of the Figure, there is a timer 214 which is used for signaling a fault status when some function has exceeded a preset time limit. A second timer 212 is a trigger-go timer, used as a software fault indicator.

Page bank select register (PBSR) 222 and bank select compare 224 are used in connection with the 1750B implementation discussed below. PBSR 222 can be read or written by the CPU. The read command is a broadcast command that goes to all memory management units in the system. The CPU will change the PBSR when it is going to perform an I/O read or write operation on a memory bank different from the one pointed to by the PBSR. XIO decode unit 217 is a decoder which responds to direct instructions from the CPU 10 that travel over either the data or address bus. These XIO instructions are part of the 1750 specification and are referred to in the data sheet UT1750MMU preliminary data sheet from the United Technologies Microelectronics Center, incorporated herein by reference.

Memory fault status register 230 accepts as input a bus 144 labeled PB which is used for the 1750B specification, bus 220 which is a multiplexed bus corresponding to bus 210 and bus 148 which is a four bit bus containing the AS field that is used to select the group of page registers. This register 230, a 16 bit register, available to reflect the status of unit 200 when a memory error is reported. The output of register 230 is can be multiplexed through multiplexer 235. This mux selects one of: page register, a selected memory protect RAM word, page bank register, memory fault status register or current value of the trigger-go timer to be put onto the data bus 210 and output to the CPU. There are five control lines which control the selection of what goes on the bus. These control lines are generated by XIO decoder 217.

Figure 4:
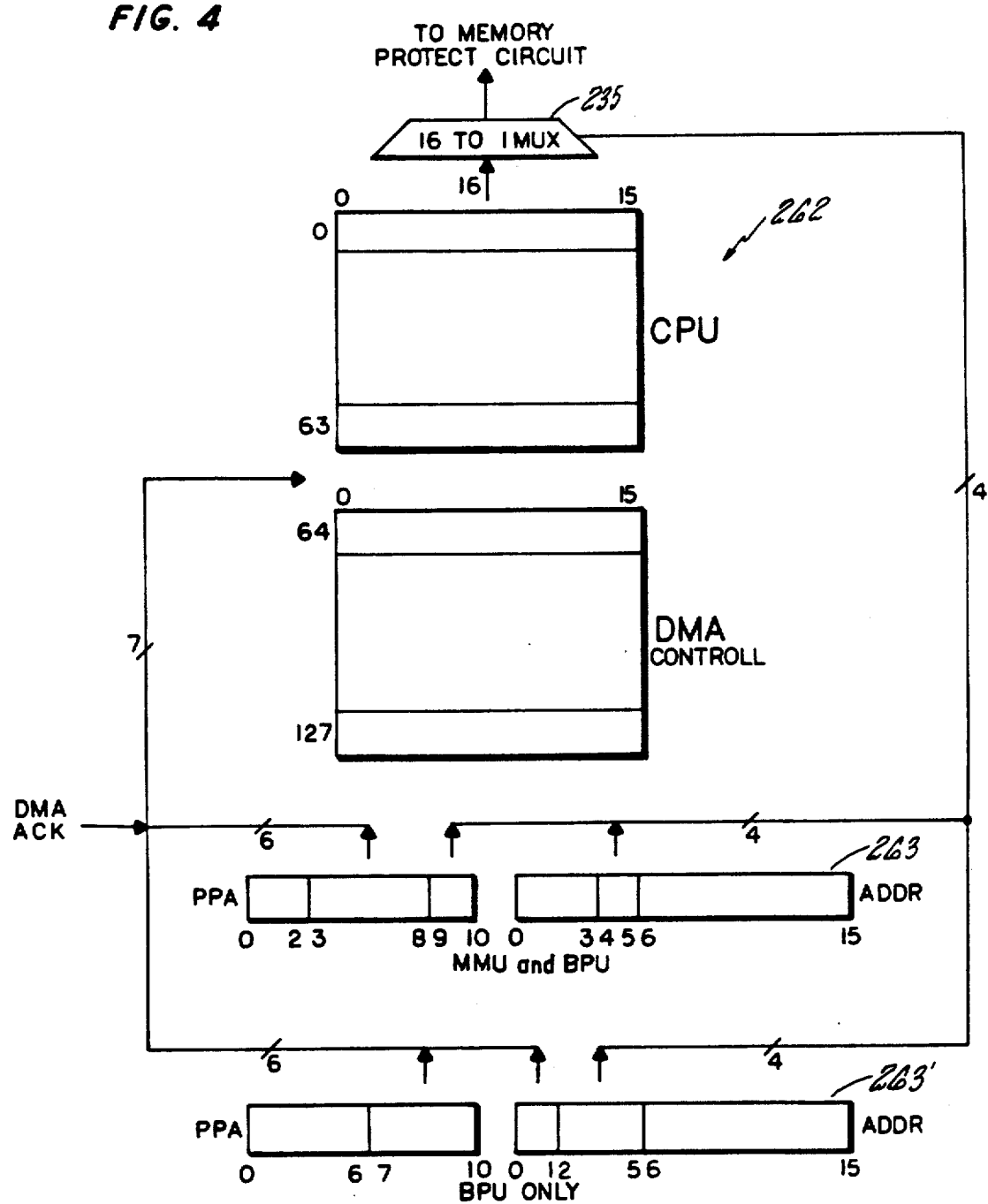
FIG. 4 illustrates the block protect RAM.

The set of three blocks 242, 250 and 245 form the lookup operation that translates the input from the CPU into the physical page address that is sent to memory. Page register control 242 is a set of control logic which responds to the AS field of the process status word and the LPA, the four highest bits of the logical address from CPU 10 as well as the D/I bit to select one page register out of 512 within page register block 250. Controller 242 performs the usual functions of setting up the memory addresses, etc., for memory 250. The output from the page register goes to page register cache 245 containing two registers, one to hold the last operation address, and the other to hold the last instruction address. The output from register cache 245 goes out as the physical page address to the memory unit 300 and is also circulated to the memory protect decode unit 268 and to the protect RAM control block 260. RAM control unit 260, which sets up the addresses, R/W, and memory enable lines for the block protect RAM, also has an input bus 220 which will ordinarily contain the address from the CPU. If the MMU is off, the BPU will only use bits from the address bus. If the MMU is on, RAM control unit 260 will use bits from both the PPA and the address bus. Which bits are used is illustrated in blocks 263 and 263' of FIG. 4.

Block 262 contains 128 16 bit words, each bit of which is a flag to protect a one K block of RAM 300. When expanded memory is off and the size of memory 300 is just the 64K space of CPU 10, then only the first four words of block 262 are used. The two most significant bits of the address bus 132 select the correct word. The next four bits in the address bus select the current bit. These four bits go to mux 207 to select the correct bit.

When the expanded memory function is on, bits 3-8, along with the DMA acknowledge signal select the proper word in block 262. Bits 9 and 10 of the physical page address on line 134 and bits 4 and 5 of the logical address on line 132 select the correct bit from the selected word. Bit 0 of word 0 protects the first 1K word block of memory and bit 15 of word 63 protects the last 1K word block of the one megabyte memory space. This covers the half of memory space that is used for CPU access, with the other half being reserved for DMA access.

When expanded memory is off, the bits used to control block protects are different. In this case, bits 7-10 of the PPA plus the DMA signal and bits 0-1 of the address bus select the correct word (only four words will be needed to account for the 64K address space) and bits 2-5 of the address select the correct bit from the word. Control signals are applied to pins on the chip to specify MMU mode, BPU mode or both.

A memory protect flag will be set on the occurrence of any one of three cases: the access key did not match the access lock signal, the user attempted to execute an instruction from a protected area of memory, or the user attempted to write data into a protected area memory. The memory protect cache functions in the same manner as the page register cache.

Unit 200 contains within it an arbitration circuit 280 which provides the feature that the memory management unit itself, rather than the CPU, will arbitrate between two contending bus masters that attempt to access memory. For example, there may be contention between the CPU and a separate DMA unit. Arbitrator 280 has 7 signals that it uses: A bus request signal, a bus request enable signal and a bus grant signal for each of two bus masters and a busy signal. The bus master which has control of the bus will assert a busy signal that is input to unit 280 and blocks access for the duration of the bus cycle. The enable bus request lines permit the CPU or some other system feature to enable or disable the bus request feature for one or both of the contending bus masters. The system may be switched "on the fly" between a mode in which bus arbitration is independent of the CPU and another mode in which the CPU intervenes through control of the bus request enable lines to discriminate between bus masters. If unit 200 receives two bus requests at once, it uses a hard wired priority for bus number 1.

Although the system illustrated in FIG. 1 uses separate address and data buses, it is possible to use a time multiplexed bus for both purposes when the mux DA signal is asserted. In that case, bus 110 will be ignored and bus 132 will be used.

Figure 5:
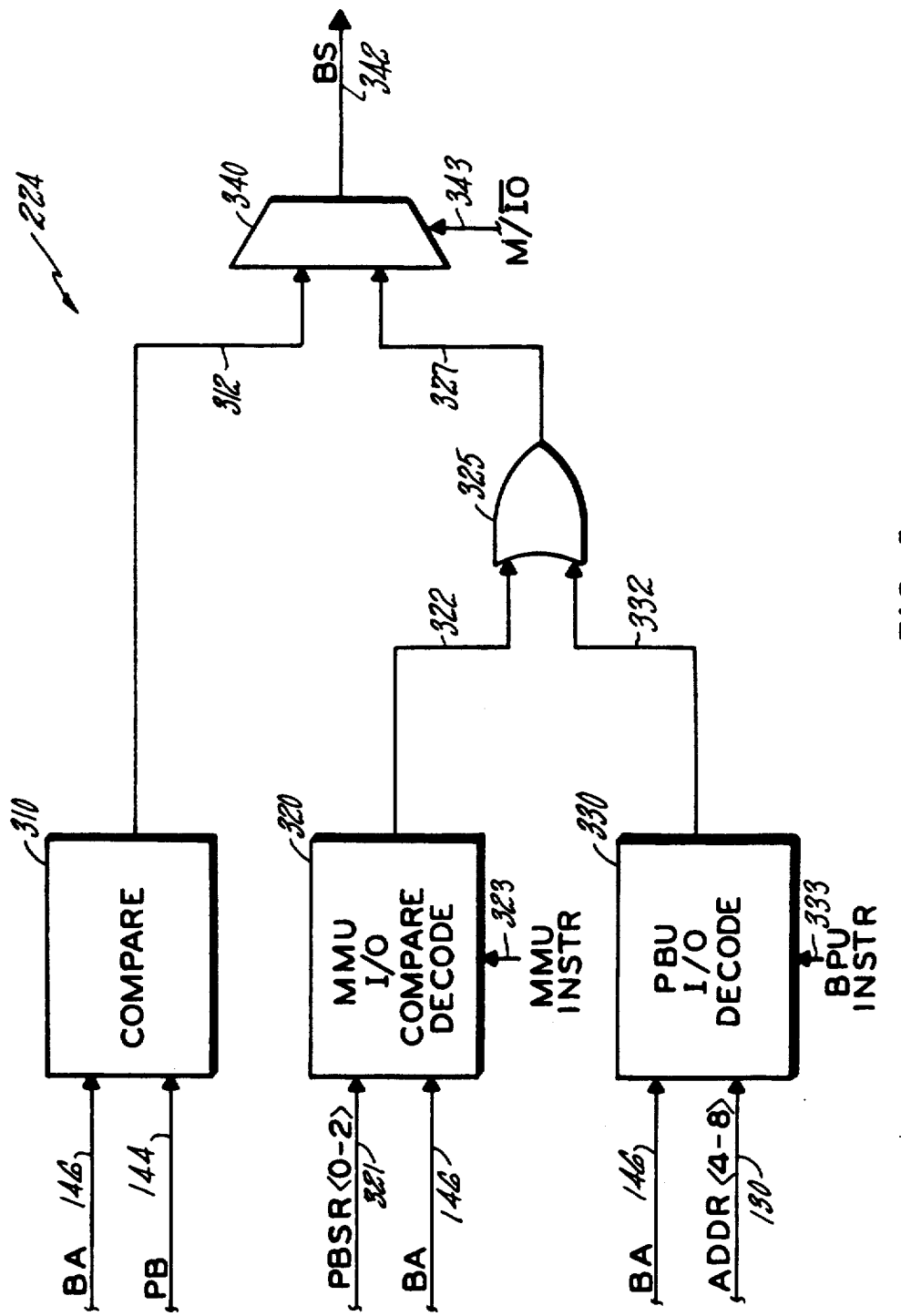
FIG. 5 illustrates a portion of FIG. 2.

An advantageous feature of the invention is the ability of the circuit to detect automatically whether the system is operating in 1750A or 1750B mode and also whether the chip has been selected, based on the address transmitted by the CPU and by a portion of the CPU status word. Referring to FIG. 5, there is shown a portion of block 224, the bank select compare unit. Comparison unit 310 compares the PB signal on line 146 with the externally hard-wired BA signal. In the case of 1750A applications, the BA signal will always match, since only one MMU unit is required, and these inputs use pull-down input buffers. In the case of 1750B applications, the presence of signals on the pins indicates that the 1750B mode is active and a match between the page bank (PB) signal from the CPU status word indicates that this particular chip is selected. This half of the Figure performs the function of identifying that this chip has been selected and also which mode it is in, without the need for a dedicated pin to flip the mode, or for the CPU to send a special mode command.

The bottom half of the Figure will operate in both 1750A and 1750B modes to flag that one of the MMU or BPU I/O operations is being carried out. Unit 320 is activated by the BA signal on line 323 from XIO decoder 217 that an MMU I/O instruction is present on the bus. Unit 320 compares bits 0-2 of the Page Bank Select Register and the BA bus to generate a signal on line 322 indicating that a memory management XIO function is required from this chip. Similarly, unit 330, activated by a signal on line 333 from XIO decoder 217, decodes the BA bus and bits 4-8 of the address to generate a signal on line 332 indicating that a block protect XIO function is to be performed by this chip.

These two signals are ORed in circuit 325 to produce an input on line 327 to multiplexer 340. Multiplexer 340 is controlled by the M/IO signal from the CPU on line 343 such that when the signal is asserted, multiplexer 340 passes the signal on line 327 to line 342 and when it is quiescent, the signal on line 312 is passed through. Bank select comparison unit thus serves as a bank selection means that both identify which chip is to operate on the data on the bus, and also selects the mode of operation and thus controls the number of bits in the address fields. Units 320 and 330 serve in both modes A and B respectively as management control means for identifying that this chip is to respond to a memory management instruction and as memory protection control means for identifying that this chip is to respond to a memory protection instruction. Those skilled in the art will appreciate that three units perform chip selection operations in mode B, with different input data. The BA signal is common to all, but unit 320 responds to the contents of the PBSR and unit 330 responds to the address issued by the CPU, rather than to the PB signal sent to unit 310.

The BS signal in FIG. 5 passes to timing controller 226, a state machine that has additional inputs indicating BPU and/or MMU cache hits, address strobe and data strobe. This machine generates RDYAB, indicating to the memory that the physical page address is ready and DTACKB, indicating to the CPU that the current XIO instruction is completed. Unit 226, in response to a BS signal, sends out different timing and control signals to carry out the memory and instruction operations. Thus, all decoding indicating chip selection and mode of operation, between memory instructions and both BPU and MMU instructions, are carried out in this portion of the chip.

It should be understood that the invention is not limited to the particular embodiments shown and described herein, but that various changes and modifications may be made without department from the spirit and scope of this novel concept as defined by the following claims.

I claim:

1. An integrated circuit, connected to a CPU meeting the MIL-STD 1750A specification, to a memory through an address bus connected to said CPU and to said memory, for expanding the address range of said CPU comprising:
   memory management means for transforming an address from said CPU to an expanded address and for providing memory protection in a 1750A mode, and;
   block protect means for protecting selected blocks of memory from being written to, characterized in that;
   said integrated circuit includes means for generating a first partial address field to be combined with a portion of an address on said address bus to form a physical address directed to said memory;
   said integrated circuit includes bank selection means for comparing a bank address field transmitted from said CPU and a set of fixed signals on external terminals of said integrated circuit to generate a bank select signal both that said integrated circuit has been selected and that it is to operate in accordance with the MIL-STD 1750B specification, whereby said circuit automatically operates in a 1750B mode;
   said memory management means and said block protect means contain memory circuits responsive to said bank select signal for meeting said 1750B specification, said memory circuits including means for storing an additional three-bit memory field within a set of page registers to form with said first partial address field a second expanded partial address field to be combined with a 12-bit field on said address bus to form said physical address; and
   said integrated circuit further includes state machine means, responsive to said bank selection signal, for generating predetermined control and timing signals in at least said 1750A and 1750B different modes of operation, for memory operations and instruction operations, whereby said memory circuits respond to a first state machine output signal dependent on said bank select signal.

2. An integrated circuit according to claim 1, further characterized in that:
   said integrated circuit further includes instruction control means, responsive to said bank address field and to the contents of a predetermined register written to by a broadcast command from said CPU, for generating a memory management unit output selection signal for activating memory management instruction control modules in said integrated circuit to respond to predetermined instructions from said CPU;
   said integrated circuit further includes memory protection control means, responsive to said bank address field and to a portion of a memory address from said CPU, for generating a BPU output selection signal for activating BPU instruction control modules within said integrated circuit;
   said circuit further includes multiplexer means, responsive to a control signal from said CPU defining the current cycle as a memory or an instruction cycle, for selecting said bank selection signal either from said bank selection means or from at least one of said instruction control means and memory protection control means, whereby said bank selection signal indicates one of three different triggering conditions dependent on the mode of operation of said circuit.

3. An integrated circuit according to claim 1, further characterized in that bus arbitration means within said integrated circuit responds to bus requests from two bus masters on external pins of said integrated circuit comprising two bus request pins, two bus request enable pins and two bus grant pins and internal means responsive thereto for enabling bus request operation and for arbitrating contention between two bus masters, whereby said system may arbitrate between two bus masters independently of said CPU, yet also be controlled by said CPU through said bus request enable pins to discriminate between said two bus masters, so that said circuit may alternate between a first bus control mode in which bus arbitration is independent of said CPU and a second bus control mode in which said CPU discriminates between bus masters by assertion of said bus request enable pins.

4. An integrated circuit according to claim 2, further characterized in that bus arbitration means within said integrated circuit responds to bus requests from two bus masters on external pins comprising two bus request pins, two bus request enable pins and two bus grant pins and internal means responsive thereto for enabling bus request operation and for arbitrating contention between two bus masters, whereby said system may arbitrate between two bus masters independently of said CPU, yet also be controlled by said CPU through said bus request enable pins to discriminate between said two bus masters, so that said circuit may alternate between a first bus control mode in which bus arbitration is independent of said CPU and a second bus control mode in which said CPU discriminates between bus masters by assertion of said bus request enable pins.

* * * * *